United States Patent [19]

Brent

[11] 4,191,202

[45] Mar. 4, 1980

[54] POLARITY CONTROL VALVE

[75] Inventor: Robert G. Brent, Arlington, Tex.

[73] Assignee: Textron, Inc., Ft. Worth, Tex.

[21] Appl. No.: 915,505

[22] Filed: Jun. 14, 1978

Related U.S. Application Data

[63] Continuation of Ser. No. 735,268, Oct. 26, 1976, abandoned.

[51] Int. Cl.[2] .................. H01M 6/30

[52] U.S. Cl. .................. 137/112; 91/420; 91/466

[58] Field of Search .................. 137/106, 112, 625.18; 91/420, 464, 446, 448, 466; 417/315

[56] References Cited

U.S. PATENT DOCUMENTS

| | | | |
|---|---|---|---|
| 2,837,106 | 6/1958 | Bauer | 137/106 |
| 3,282,284 | 11/1966 | Harris | 137/112 |
| 3,738,379 | 6/1973 | Wilke | 137/106 |

*Primary Examiner*—Abraham Hershkovitz
*Attorney, Agent, or Firm*—Richards, Harris & Medlock

[57] ABSTRACT

A polarity control valve enables the undiscriminating interconnection of a pressure line and a return line to two available ports to provide fluid pressure at an output line and a return connection through a return port. This feature of interconnecting either the pressure line or the return line to any of the two available ports is achieved by a pressure positionable spool mounted in a ported sleeve. The spool is positionable between one of two positions depending upon which port is connected to the pressure line. By controlling the distribution of lands on the spool the position thereof always establishes a fluid path from the pressure line to an output port connected to a fluid pressure responsive component. Fluid returning from the component is likewise directed by means of the positionable spool to the return line.

4 Claims, 3 Drawing Figures

U.S. Patent Mar. 4, 1980 4,191,202

POLARITY CONTROL VALVE

This is a continuation of application Ser. No. 735,268, filed Oct. 26, 1976 and now abandoned.

This invention relates in general to a hydraulic polarity control valve, and more particularly to a valve for routing fluid pressure to the pressure input ports of a hydraulic component.

A fluid pressure operated polarity control valve to which this invention is addressed includes a piston adapted to reciprocate in an axial direction in a cylinder wherein the piston is moved axially by the admittance of fluid under pressure to direct the applied pressure to a valve output port. Such a polarity control valve has many applications in hydraulic systems, for example, aboard an aircraft where a reverse interconnection of a pressure line and a return line may produce a control reaction resulting in a destruction of the aircraft.

It is well known that in many hydraulic systems the pressure and return lines have a definite connection pattern to insure proper and full range operation of the system. Heretofore, many devices have been provided to insure the correct interconnection of a pressure line and a return line to a hydraulic system. For example, one common practice is to provide different size pressure and return ports and different size pressure and return lines. In addition to the disadvantage of requiring two different size lines throughout the system, it has been found that adapters are readily available that convert the line size to the port size thereby enabling a reversal of connections. Another technique often used to insure the proper polarity connection in a hydraulic system is to physically separate the pressure port from the return port and tailor the line length to the distance requirement for a correct port. This also has proven not to provide adequate safeguards against the inadvertent reversal of the connection of a pressure line and a return line.

In addition to attempts to control the connection of the pressure line and the return line to the correct port, devices have also been utilized to prevent an incorrect connection from effecting the components of the hydraulic system. One such device is the simple relief valve which dumps pressurized fluid to the return line when there is an incorrect connection to the hydraulic system. While such devices may prevent damage to a particular component a control function may be disabled thereby jeopardizing the complete operation of the entire system.

A feature of the present invention is to provide a polarity control valve for controlling the polarity of pressure applied to a hydraulic system. The present invention provides a valve that employs the same size pressure and return ports thereby enabling the simplification of the total plumbing arrangement. By controlling the routing of fluid pressure from a pressure line to a system component, the need for special failsafe elements is minimized.

In accordance with the present invention, a polarity control valve provides optional connections between a pressure source line and a return line and includes first and second connecting ports opening into a chamber of a valve housing. First and second flow channels in the housing extend between the chamber output ports for connecting to a hydraulic component. Within the chamber a valve spool is slidably mounted with radially extending lands forming separate annular chambers. Flow passages in the spool direct pressurized fluid from the first and second connecting ports to opposite ends thereof thereby positioning the spool in the chamber and channeling fluid pressure always to the same output port. The porting and chamber arrangements are thus constructed to enable an arbitrary connection of a pressure source line and a return line to the first and second connecting ports.

A more complete understanding of the invention and its advantages will be apparent from the specification and claims and from the accompanying drawings illustrative of the invention.

Referring to the drawings.

Figure 1:
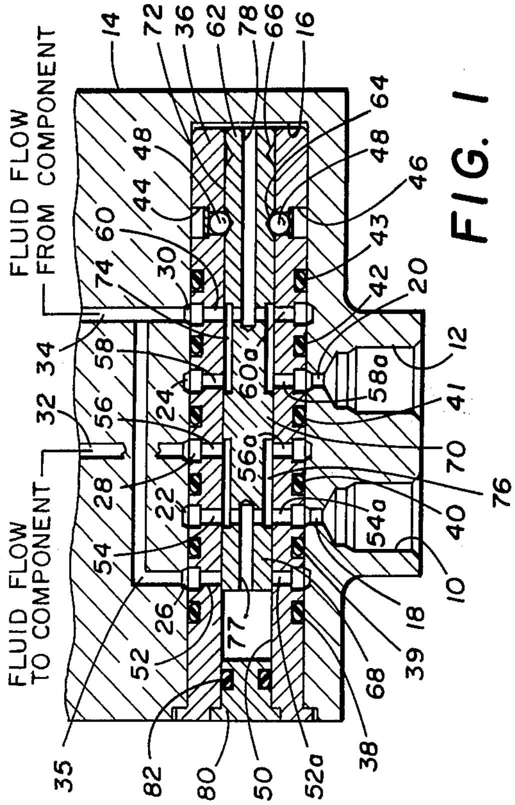
FIG. 1 is a hydraulic schematic of an embodiment of the present invention for controlling the polarity of a pressure source connected to a hydraulic component.

Referring to FIG. 1, there is shown a schematic of the polarity control valve of the present invention that enables the pressure line and a return line for a hydraulic system to be interchangeably connected to ports 10 and 12 of a valve housing 14. Inasmuch as the pressure line and return line may be interchangeably connected to the ports 10 and 12, these ports may be the same size with the same thread direction and in all respects similar to each other. Also, the pressure line and the return line may be similar although some identification between the lines is preferred.

While the polarity control valve of the present invention is shown schematically in FIG. 1 independent of a hydraulic actuator, it should be understood that to achieve the polarity control a component must be connected as an integral part of the control valve. That is, the passages 32 and 34 are permanently assembled with passages of the hydraulic actuator.

Formed within the housing 14 there is a chamber 16 generally centered on parallel passages 18 and 20 extending from the ports 10 and 12, respectively. Passages 18 and 20 terminate into the chamber 16 at annular grooves 22 and 24 formed within the housing 14. Additional annular grooves 26, 28 and 30 are also formed in the walls of the chamber 16. The annular groove 28 is located at the end of a passage 32 extending to an element of the hydraulic system with which the valve of FIG. 1 is associated. The annular grooves 26 and 30 are located at the termination of a passage 34 that provides a conduit for returning fluid from the element of the hydraulic system connected to the passage 32.

Assembled within the chamber 16 is a sleeve 36 having annular grooves cut in the outer surface thereof to align with the grooves in the walls of the chamber 16. Thus, there is formed for each of the grooves 22, 24, 26, 28 and 30 an annulus conduit for the flow of fluid to various passages of the housing 14. To isolate each of these flow passages, the sleeve 36 is fitted with spaced O-ring seals 38–43 in circular cutouts on the outer surface of the sleeve 36.

Toward the right of the O-ring seal 43 in the sleeve 36 there are openings 44 and 46 extending through the sleeve. Each of these openings is equipped with a spring loaded detent ball 48 extending through the inner wall of the sleeve 36 into a sleeve chamber 50. These detent balls 48 will be explained in greater detail later in this description.

Mating with each of the annulus conduits associated with the grooves 22, 24, 26, 28 and 30 are passages extending through the sleeve 36 and opening into the chamber 50. Specifically, passages 52 and 52*a* extend from the groove 26 into the chamber 50. Passages 54 and 54*a* extend from the groove 22, passages 56 and 56*a* extend from the groove 28, passages 58 and 58*a* extend from the groove 24 and passages 60 and 60*a* extend from the groove 30. Thus, there is a fluid path from each of the ports 10 and 12 directly into the chamber 50 and there is also a fluid path from each of the passages 32 and 34 also into the chamber 50.

Slidably mounted within the sleeve 36 is a valve spool 62. This spool 62 includes two V-shaped detents 64 and 66 that cooperate with the detent balls 48 to provide a means for locating the valve spool 62 into one of two positions. Axially spaced along the valve spool 62 are lands 68, 70 and 72 that form chambers 74 and 76 within the chamber 50 between the valve spool lands. A passage 77 opens into the chamber 76 and terminates at the left face of the valve spool 62. Similarly, a passage 78 opens into the chamber 74 and terminates at the right face of the valve spool.

Enclosing the chamber 50 is an end cap 80 having an annular groove formed therein and equipped with an O-ring seal 82. The end cap 80 may be press fit or otherwise secured into the chamber 50 to form a fluid tight assembly.

In operation of the polarity control valve of FIG. 1, with the pressure line connected to the port 10 and the return line connected to the port 12 and an element of a hydraulic system connected to the passages 32 and 34, fluid is channeled through the passage 18 into the chamber 76 and through the passage 56 into the passage 32. Fluid channeled through the passage 18 is also diverted through the passage 77 into the chamber 50 producing a force against the left face of the spool 62 driving the spool into the position shown.

In addition to establishing a fluid flow path from the port 10 to the passage 32, the spool 62 in the position shown also establishes a return fluid path from the passage 34 through the passage 60 into the chamber 74 and through the passage 20 and the port 12 into the return line. Fluid in the passage 34 is also channeled through the passage 78 to the right face of the spool 62. However, since the supply pressure producing a force acting on the left face of the spool 62 plus the force exerted by the detent balls 48 is greater than the force produced by the return pressure acting on the right face of the spool, it is maintained in the position as illustrated in FIG. 1. Thus, pressurized fluid applied to the port 10 is channeled into the passage 32 into the component and returned from the component through the passage 34 and out of the port 12.

Figure 2:
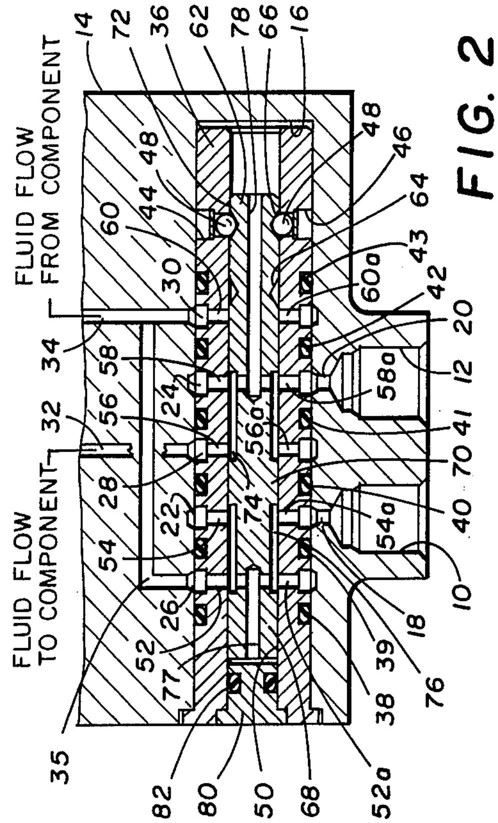
FIG. 2 is a hydraulic schematic of the valve of FIG. 1 showing the valve spool in the alternate of two positions to thereby maintain the fluid pressure to the same output port.

Referring to FIG. 2, assume that the pressure line and the return line are interchanged such that the pressure line is now connected to the port 12 and the return line connected at the port 10. Fluid from the pressure line is channeled through the passage 20 into the chamber 74 and then into the passage 34. However, pressurized fluid is also channeled through the passage 78 to the right face of the spool valve 62. Before pressure can build up in the passage 34, a force exerted on the right face of the spool valve 62 moves the spool against the force generated by the detent balls 48 to the left position as shown in FIG. 2. The detent balls 48 now engage the detent 66 to maintain the spool 62 in the far left position. Thus, the detent balls 48 function to establish the two positions of the valve spool 62.

With the valve spool 62 in the position shown in FIG. 2, pressurized fluid applied to the port 12 is channeled through the passage 20 into the chamber 74 and from the chamber 74 through the passage 56 into the passage 32. Passage 32 again connects to the supply side of an element in a hydraulic system.

Fluid returned from the element of the hydraulic system is channeled through the passage 34 and the passage 35 through passage 52 into the chamber 76 and from the chamber 76 through the passage 54*a*, passage 18 and thence to the return line connected to the port 10. The valve of FIG. 1 has thus selectively connected either the port 10 to the passage 32 and port 12 to the passage 34, or port 12 to the passage 32 and port 10 to the passage 34. The selection is made on the basis that the port connected to the pressure line will always be connected to the passage 32 and the port connected to the return line will always be connected to the passage 34. This selection is achieved by positioning the valve spool 62 in either of its two detent positions.

Figure 3:
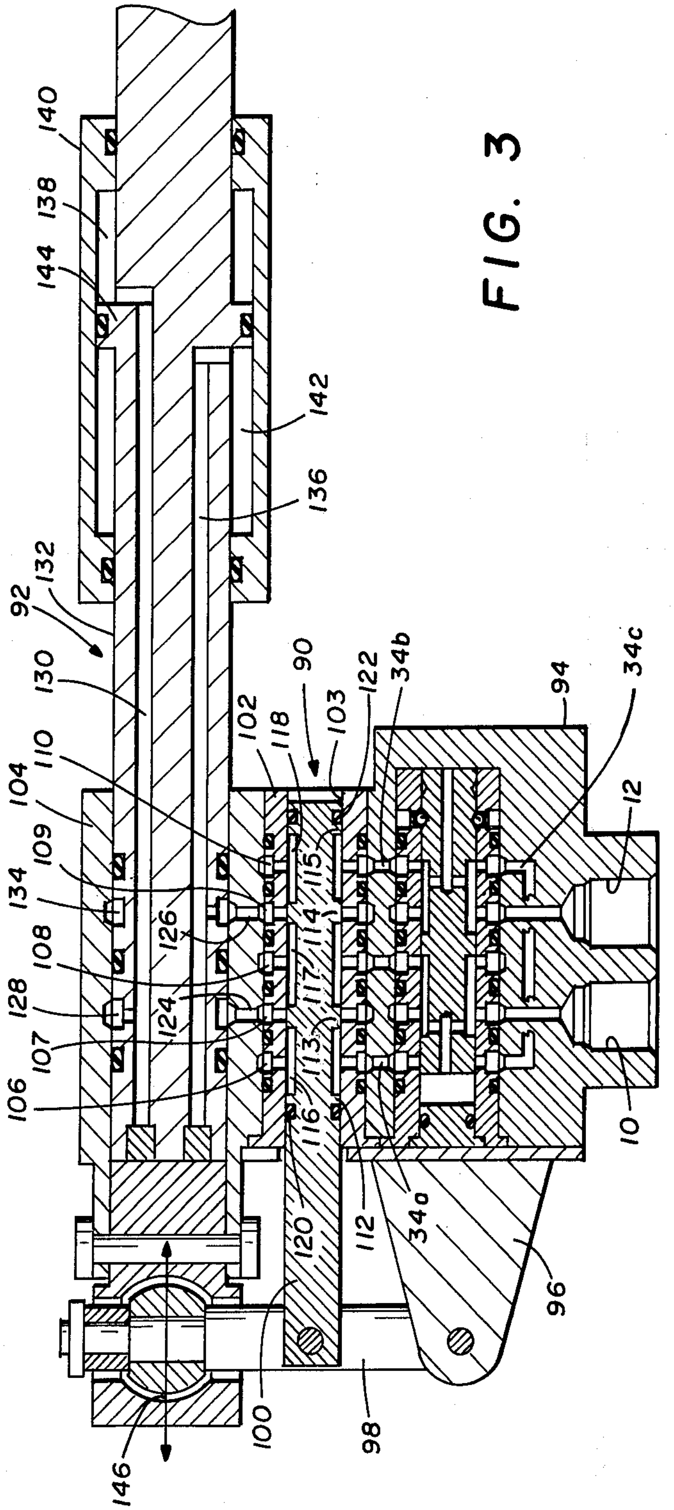
FIG. 3 is a hydraulic schematic of a servo actuator responsive to a mechanical input motion and coupled to the polarity control valve of the present invention.

Referring to FIG. 3, there is shown a utilization of the polarity control valve of FIG. 1 in an application for directing pressurized fluid to a servo valve 90 controlling actuator piston 92 such as used in positioning aircraft control surfaces. The polarity control valve includes a housing 94 modified slightly from the housing of FIG. 1 in that the passage 34 is split in two sections 34*a* and 34*b*. Attached to the end of the housing 94 is a pivot bracket having pivotally attached thereto a control rod 98 for positioning a valve spool 100 of the servo valve 90.

The servo valve 90 includes a sleeve 102 having a cylindrical chamber 103 for slidably supporting the valve spool 100. As illustrated, the sleeve 102 mates with the housing 94 of the polarity control valve and also mates with a housing 104 of the piston actuator 92. Between the housings 94 and 104 there is a series of annulus channels 106–110 each communicating with a passage opening into the cylindrical chamber 103. O-ring seals are located on either side of the annulus channels 106–110 in grooves formed in the housing 102 to provide an interchannel seal.

In a conventional manner, the valve spool 100 is provided with axially displaced lands 112–115 to form chambers 116–118. O-ring seals 120 and 122 provide a fluid seal between the chambers 116 and 118 and external of the sleeve 102 and housing 104.

Fluid channeled through the polarity control valve into the servo valve 90 is proportionally channeled into either passage 124 or passage 126 of the housing 104. The passage 124 terminates in an annulus channel 128 opening into a passage 130 of a piston rod 132 of the actuator 92. Similarly, the passage 126 opens into an annulus channel 134 opening into a passage 136 in the piston rod 132.

Passage 130 of the piston rod 132 opens into a chamber 138 in a barrel 140 of the actuator 92. The passage 136 opens into a chamber 142 also in the barrel 140. The chambers 138 and 142 are defined on either side of a piston 144 on the piston rod 132.

In operation of the servo valve 90 and the piston rod 132 of actuator 92, movement of the control rod 98 along a path shown by the arrow 146 causes the valve spool 100 to be slidably positioned within the sleeve 102. Pressurized fluid from the polarity control valve is channeled through the servo valve 90 by means of the chambers 116–118 into either the passage 130 or the passage 136. As the pressure in one of the chambers 138 or 142 increases with respect to the pressure in the other chamber, the piston rod 132 moves relative to the barrel 140. Fluid in the chamber having a decreasing volume is forced through the servo valve 90 into the passages 34*a* or 34*b* which are connected together by passage 34*c* and around the valve spool 62 to the return line coupled to either port 10 or port 12.

As shown in FIG. 3, a fluid pressure in a line coupled to the port 10 positions the valve spool 62 in the detent position as illustrated forming a fluid path through the passage 18 around the spool 62 and to the passage 32 into the chamber 117 of the servo valve 90. Pressurized fluid in the chamber 117 is then proportionally controlled into the chambers 138 and 142 as explained. The servo valve 90 and actuator 92 function as described above to complete a control function.

Assuming that the pressure line connects to port 12 and the return line connects to port 10, then the valve spool 62 will be positioned in the second detent position as illustrated in FIG. 2. Pressurized fluid will be channeled through the chamber 74 and the passage 32 to the chamber 117 of the servo valve 90. Thus, the servo valve 90 is isolated from any interchange of the connection of the pressure line and return line to the ports 10 and 12.

It will be clear from the above that the polarity control valve of the present invention may be implemented as an independent element of a hydraulic control system, as illustrated in FIGS. 1 and 2 preferably, or incorporated and integrated into a component such as a servo actuator as illustrated in FIG. 3. In each application, the polarity control valve functions to control the channeling of pressurized fluid to the passage 32 and the channeling of return fluid through passage 34 into the return line interchangeably connected to the ports 10 and 12.

While several embodiments of the invention, together with various modifications thereof, have beend described in detail herein and shown in the accompanying drawings, it will be evident that various further modifications are possible without departing from the scope of the invention.

What is claimed is:

1. In a hydraulic actuator system including fluid pressure controlled elements, the improvement of a polarity control valve for establishing a hydraulic flow path from a pressure line connected to either of two input passages to the same one of two flow channels, comprising:

- a housing having a chamber therein;
- first and second input passages opening into the chamber of said housing;
- first and second flow channels between the chamber and a fluid pressure controlled element; and
- a valve spool slidably mounted for positive movement between first and second positions in said chamber and having radially extending lands to form separate annular chambers, said valve spool including:
  - a first annular chamber for connecting the first flow channel to the first input passage when the pressure line is connected to the first input passage and for connecting the second flow channel to the first input passage when the pressure line is connected to the second input passage;

- a second annular chamber for connecting the first flow channel to the second input passage when the pressure line is connected to the second input passage and for connecting the second flow channel to the second input passage when the pressure line is connected to the first input passage;
  - said first and second annular chambers being out of fluid communication with each other in all positions of the valve spool;
  - flow passages in said spool to direct fluid pressure from the first and second input passages to opposite ends of said spool to positively move said valve spool between said positions and thereby establish the above described connections through said first and second annular chambers; and
  - means disposed within said housing for releasably holding said valve spool in said positions, said means being responsive to a preestablished pressure differential between the input passages.

2. A polarity control valve for establishing a flow path from a pressure line connected to either of two input passage to the same one of two output passages, comprising:

- a housing with a chamber therein;
- a first input passage in said housing opening into the chamber;
- a second input passage in said housing opening into the chamber;
- a first output passage in said housing opening into the chamber;
- a second output passage in said housing opening into the chamber; and
- a valve spool positionable between first and second positions in said chamber and having radially extending lands to form separate annular chambers, said valve spool including:
  - a first annular chamber for connecting the first output passage to the first input passage when the pressure line is connected to the first input passage and for connecting the second output passage to the first input passage when the pressure line is connected to the second input passage;
- a second annular chamber for connecting the first output passage to the second input passage when the pressure line is connected to the second input passage and for connecting the second output passage to the second input passage when the pressure line is connected to the first input passage;
  - said first and second annular chambers being out of fluid communication with each other in all positions of the valve spool;
  - means in said spool to direct fluid pressure from the first and second input passages to opposite ends of said spool to establish the above described connections through said first and second annular chambers by positively moving said spool to the first position when the pressure line is connected to the first input passage and by positively moving said spool to the second position when the pressure line is connected to the second input passage; and
  - means between said valve spool and the housing for releasably holding said valve spool in each of said positions responsive to a preestablished pressure differential between said input passages.

3. A polarity control valve as set forth in claim 2 wherein said means for holding said spool in each of said positions comprises at least one spring-loaded detent ball.

4. A polarity control valve as set forth in claim 2 wherein said means in said spool to direct fluid pressure includes a first longitudinal passage for connecting the first annular chamber to one end of said valve spool and a second longitudinal passage for connecting the second annular chamber to the opposite end of said valve spool.

* * * * *